(12) United States Patent
Urakawa

(10) Patent No.: US 7,573,626 B2
(45) Date of Patent: Aug. 11, 2009

(54) OPTICAL SCANNER AND IMAGE DISPLAY APPARATUS HAVING THE SAME

(75) Inventor: Takashi Urakawa, Kanagawa-ken (JP)

(73) Assignee: Canon Kabushiki Kaisha (JP)

( * ) Notice: Subject to any disclaimer, the term of this patent is extended or adjusted under 35 U.S.C. 154(b) by 1032 days.

(21) Appl. No.: 11/056,453

(22) Filed: Feb. 11, 2005

(65) Prior Publication Data

US 2005/0179951 A1 Aug. 18, 2005

(30) Foreign Application Priority Data

Feb. 16, 2004 (JP) ............................. 2004-038267

(51) Int. Cl.
*G02B 26/08* (2006.01)
(52) U.S. Cl. .............. 359/224.1; 359/198.1; 359/199.1; 359/224.2
(58) Field of Classification Search ................. 359/199, 359/224, 224.1–224.2
See application file for complete search history.

(56) References Cited

U.S. PATENT DOCUMENTS

| 5,467,104 A | 11/1995 | Furness, III et al. |
| 5,606,447 A | 2/1997 | Asada et al. |
| 5,629,790 A * | 5/1997 | Neukermans et al. ........ 359/198 |
| 5,982,528 A * | 11/1999 | Melville ....................... 359/224 |

FOREIGN PATENT DOCUMENTS

| JP | 8-334723 A | 12/1996 |
| JP | 3-219465 B2 | 8/2001 |

OTHER PUBLICATIONS

M. P. Helsel et al.; "Wafer Scale Packaging for a MEMS Video Scanner"; *Proceedings of SPIE*; vol. 4407 (Jun. 2001); pp. 214-220.

* cited by examiner

*Primary Examiner*—James Phan
(74) *Attorney, Agent, or Firm*—Rossi, Kimms & McDowell LLP

(57) ABSTRACT

Provided is an optical scanner for observing an image that is formed by performing two-dimensional scanning with the aid of a swinging movable mirror, using light beams modulated on the basis of image information and emitted from a light source unit. An optical scanner of the present invention includes a scanning device and a fixing member having an attachment portion for attachment of the scanning device, the scanning device including a movable mirror, an elastic support portion supporting the movable mirror such that the movable mirror can swing around a swinging center, a support base supporting the elastic support portion, and a swinging unit for swinging the movable mirror. A first surface of the attachment portion is formed on a plane of a surface of the movable mirror. A second surface of the attachment portion is formed on a plane which is perpendicular to the surface of the movable mirror and includes the swinging center. A third surface of the attachment portion is formed on a plane which is perpendicular to a surface of the movable mirror and includes a center line perpendicular to the swinging center in the surface of the movable mirror.

10 Claims, 10 Drawing Sheets

MOVABLE MIRROR SURFACE

OPTICAL SCANNER AND IMAGE DISPLAY APPARATUS HAVING THE SAME

BACKGROUND OF THE INVENTION

1. Field of the Invention

The present invention relates to an optical scanner and an image display apparatus having the optical scanner. For instance, the present invention is suited for a scanner-type image display apparatus for displaying and observing a two-dimensional image by scanning a surface to be scanned with light beams modulated based on image information emitted from light source means or for observing a two-dimensional image by directly introducing light onto eyeballs.

2. Related Background Art

There has been known an image display apparatus that displays an image by scanning the retina of an observer with the aid of light scanning means capable of two-dimensionally scanning light beams modulated on the basis of image information emitted from light source means (e.g., U.S. Pat. No. 5,467,104). U.S. Pat. No. 5,467,104 discloses a technique of scanning red, blue, and green light beams two-dimensionally, that is, horizontally and vertically, and directly forming a two-dimensional image on the retina via an optical system.

Such an image display technique has the following features. Firstly, since each single light beam is scanned to display an image, there is no need to use a display apparatus in which a plurality of pixels are formed in accordance with the required resolution as is the case with an image display apparatus employing a one-dimensional or two-dimensional image display apparatus. Secondly, in principle, no pixel defect is developed.

In realizing an image display apparatus employing such scanning means, a micro electro mechanical system (hereinafter referred to as an MEMS technology) manufactured through a semiconductor process has been known as a light scanning means (e.g., U.S. Pat. No. 5,606,447 and JP H08-334723 A). The light scanning means manufactured by the MEMS technology is lightweight and operable at high speeds. These features are favorable for image display apparatuses. Also, application of the MEMS technology to two-dimensional scanning means for a head-mounted-display apparatus has been known (e.g., SPIE Conference #4407, 19 (June 2001) Wafer Scale Packaging for an MEMS Video Scanner). These light scanning means based on the MEMS technology are designed to tilt a light-reflecting surface through the torsion occurring during resonance of the light-reflecting surface caused by a torsion bar or the like, to thereby deflect and scan light incident on the light-reflecting surface.

On the other hand, there has been known an image display apparatus that displays, on an enlarged scale and in combination with an optical system, an image which is displayed by scanning with light beams modulated on the basis of image information by means of an optical scanner employing a galvanomirror, with the optical scanner and the optical system being positioned with respect to each other with high precision (e.g., Japanese Patent No. 3219465).

To display an image scanned by an optical scanner on an enlarged scale, the optical scanner is generally used in combination with an optical system. However, the combination of the optical scanner and the optical system requires to position with respect to each other very precisely. Under such circumstances, according to an art disclosed in Japanese Patent No. 3219465, a movable mirror surface is arranged parallel to a reference surface on which another mechanical component or the like is attached to the optical scanner. However, the MEMS technology is not used in Japanese Patent No. 3219465. In an optical scanner making use of the MEMS technology, a movable mirror and an optical system must be disposed with respect to each other more precisely. Further, while the optical scanner requires a light source for radiating light beams onto the movable mirror surface, the positional adjustment of the light source also requires precision as a result of downsizing the optical scanner. Accordingly, although burdensome, the positions of the optical scanner and the light source need to be adjusted individually. Furthermore, since an adjustment mechanism must be provided, an apparatus employing the optical scanner cannot be easily downsized.

SUMMARY OF THE INVENTION

It is an object of the present invention to provide an optical scanner capable of being assembled easily without the necessity of positional adjustment during assembling and being attached to another component with high precision through a structure in which respective reference surfaces of attachment portions of a fixing member indicate the central position of a movable mirror of a scanning device.

An optical scanner according to one aspect of the present invention includes a scanning device and a fixing member having an attachment portion for attachment of the scanning device, the scanning device including a movable mirror, an elastic support portion for supporting the movable mirror such that the movable mirror can swing around a swinging center, a support base for supporting the elastic support portion, and swinging means for swinging the movable mirror, and is characterized in that: a first surface of the attachment portion is formed on a plane of a surface of the movable mirror; a second surface of the attachment portion is formed on a plane which is perpendicular to the surface of the movable mirror and includes a swinging center; and a third surface of the attachment portion is formed on a plane which is perpendicular to a surface of the movable mirror and includes a center line perpendicular to the swinging center in the surface of the movable mirror.

An optical scanner according to another aspect of the present invention includes a scanning device and a fixing member having attachment portions for attachment of the scanning device, the scanning device including a movable mirror, an elastic support portion for supporting the movable mirror such that the movable mirror can swing around a swinging center, a support base for supporting the elastic support portion, and swinging means for swinging the movable mirror, and is characterized in that: a first surface of one of the attachment portions and the fixing member is formed on a plane parallel to a surface of the movable mirror; a second surface of one of the attachment portions and the fixing member is formed in parallel to a plane which is perpendicular to the surface of the movable mirror and includes a swinging center; and a third surface of one of the attachment portions and the fixing member is formed on a plane parallel to a plane which includes a center line perpendicular to the swinging center in the surface of the movable mirror.

According to the present invention, the optical scanner in the scanner-type image display apparatus can be precisely fixed to an optical member or the like without requiring positional adjustment. This results in the simplification of its assemble and hence the enhancement of working efficiency.

Further, since there is no need to install the adjusting mechanism, the effect of downsizing can be achieved.

DESCRIPTION OF THE PREFERRED EMBODIMENTS

First Embodiment

Figure 1:
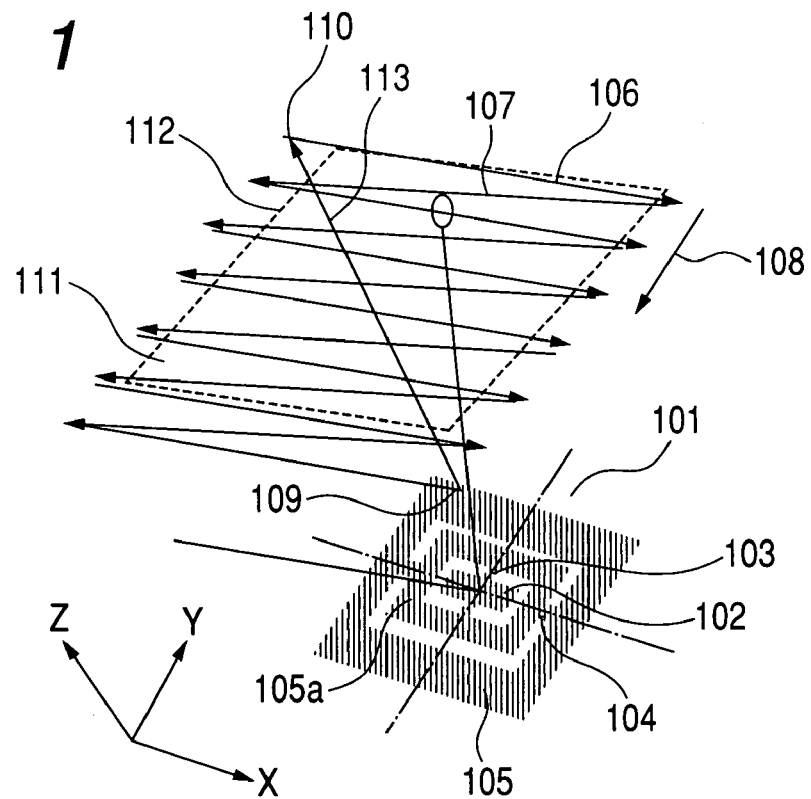
FIG. 1 is an illustrative view of the optical effect of a scanning device.

First, an image display method using an optical scanner 101 according to a first embodiment of the present invention will be described. FIG. 1 illustrates a relationship between the structure of a main part of the optical scanner 101 of the first embodiment of the present invention and a surface to be scanned 111. A movable mirror (light-deflecting reflecting mirror) 102 is formed in a central portion of the optical scanner 101. The movable mirror 102 is provided with a torsion bar (elastic support portion) 103 for swinging in a first direction and another torsion bar (elastic support portion) 104 for swinging in a second direction substantially perpendicular to the first direction, thereby constituting a gimbal structure. To describe the structure of the optical scanner 101 hereinafter, a coordinate system as shown in FIG. 1 will be used. In this coordinate system, it is assumed that X-axis represents a direction including the torsion bar 104, that Y-axis represents a direction including the torsion bar 103, and that Z-axis represents a direction of normal to the surface of the movable mirror 102. Although the movable mirror 102 is driven to swing, X-axis and Y-axis will be hereinafter referred to as rotation axes of the movable mirror 102.

The torsion bar 103 is supported by a support base portion 105a, which is supported by a support base portion 105 via the torsion bar 104. This structure allows the torsion bars 103 and 104 to be twisted independently of each other and hence allows the movable mirror 102 to be swung two-dimensionally. In the direction of X-axis (horizontal direction), the movable mirror 102 is driven by an actuator (swinging means) (not shown) using electromagnetic force, electrostatic force, or the like. The torsion-resonance effect of this structure changes the deflection angle of a reflecting surface of the movable mirror 102, and the scanning of light is thereby performed. In the direction of Y-axis (vertical direction), the movable mirror 102 is so controlled as to synchronize with the direction of X-axis, and is driven by an actuator (not shown) in a saw-toothed or triangular manner. Referring to FIG. 1, a line 106 represents the outward path of a horizontal scanning line generated by a swinging motion, whereas a line 107 represents an example of the return path of the scanning line. Although the actual number of scanning lines is greater than the number of those shown in FIG. 1, some representative scanning lines are illustrated for the sake of simplicity.

In the first embodiment, an image is displayed within an effective area 112 by operating the reflecting mirror 102 in synchronization with a swinging motion thereof to perform scanning as indicated by an arrow 108 extending in the Y-axis direction in FIG. 1, and modulating exiting light beams through synchronization of light source means. Once a vertical (Y-axis direction) scanning end 109 is reached, a return to a scanning starting point 110 is made along a retrace line 113. Namely, the repetition cycle in the vertical (Y-axis) direction determines the frame rate (frame frequency) of the image.

In the following embodiments, the movable mirror 102, the support base portion 105, and the actuator portion (swinging means) (not shown) will be collectively referred to as a scanning device.

Figure 2:
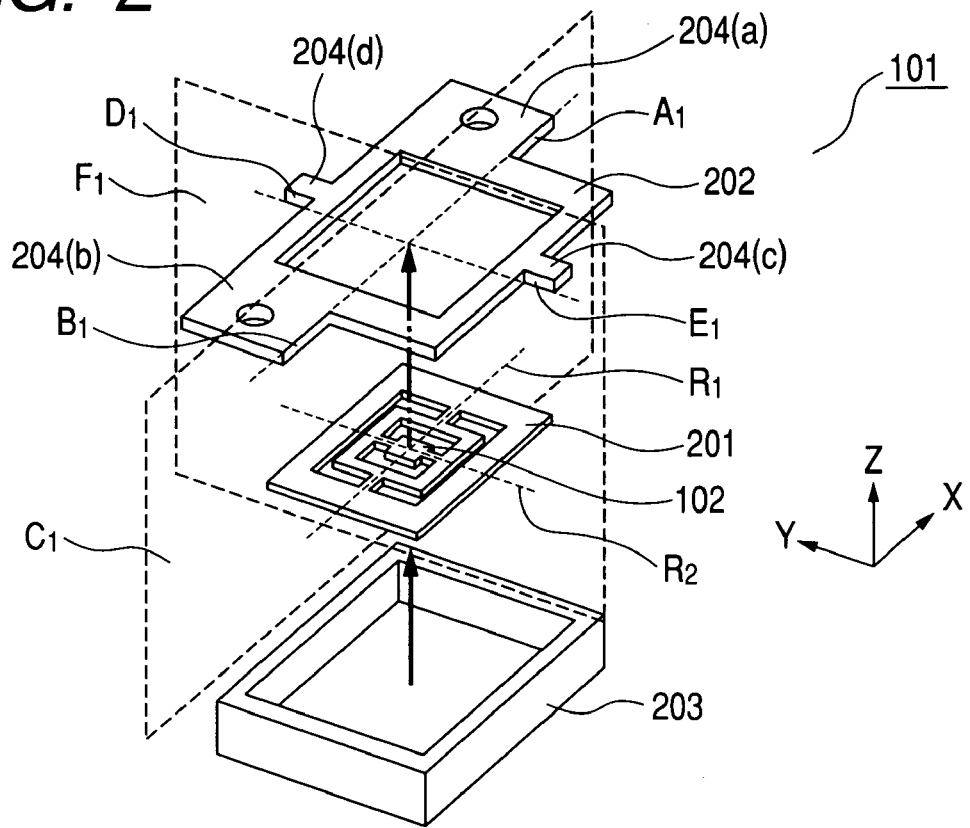
FIG. 2 is a structural view of an optical scanner according to a first embodiment of the present invention.

FIG. 2 is an exploded perspective view of the optical scanner according to the first embodiment of the present invention. The optical scanner 101 has a scanning device 201, a fixing member 202, and a case 203.

Although not shown in the first embodiment, an electromagnetic force, an electrostatic force, or the like is used as means for driving to swing the movable mirror 102 of the scanning device 201. Thus, a coil or a magnet is fixed in the case 203.

As shown in FIG. 2, the fixing member 202 has four attachment portions 204(a) to 204(d). In the respective attachment portions 204(a) to 204(d), reference surfaces $A_1$ and $B_1$ are disposed in a plane $C_1$, and a rotation center axis $R_1$, which corresponds to the X-axis direction of the movable mirror 102 of the scanning device 201, is also disposed in the plane $C_1$. Similarly, reference surfaces $D_1$ and $E_1$ of the fixing member 202 are disposed in a plane $F_1$, and a rotation center axis $R_2$, which corresponds to a Y-axis direction of the movable mirror 102 of the scanning device 201, is also disposed in the plane $F_1$.

Figure 3:
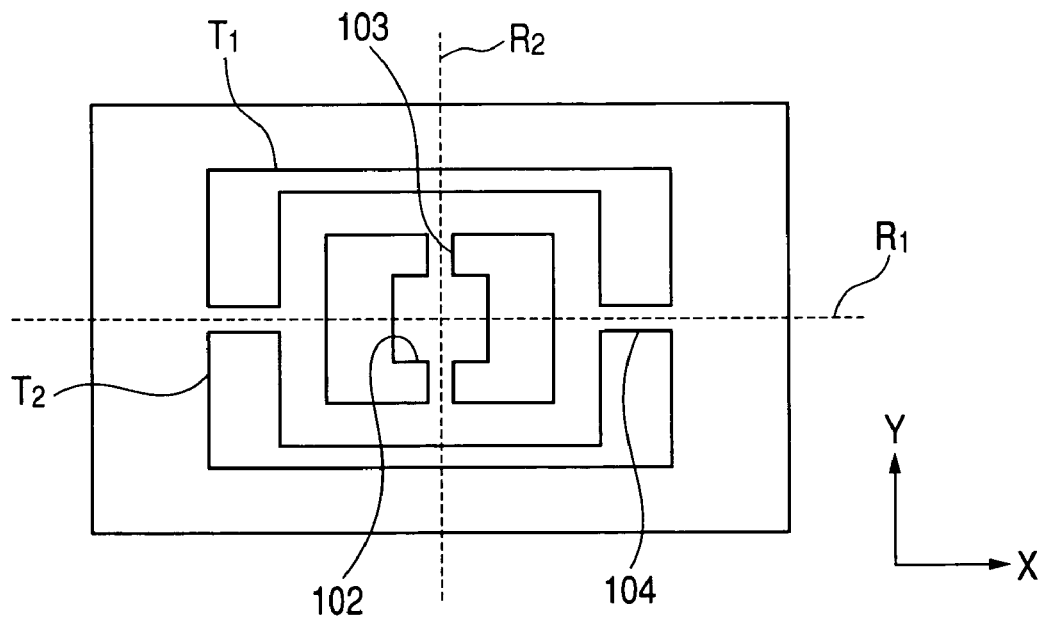
FIG. 3 is a structural view of an optical scanner according to another form of the first embodiment.
Figure 4:
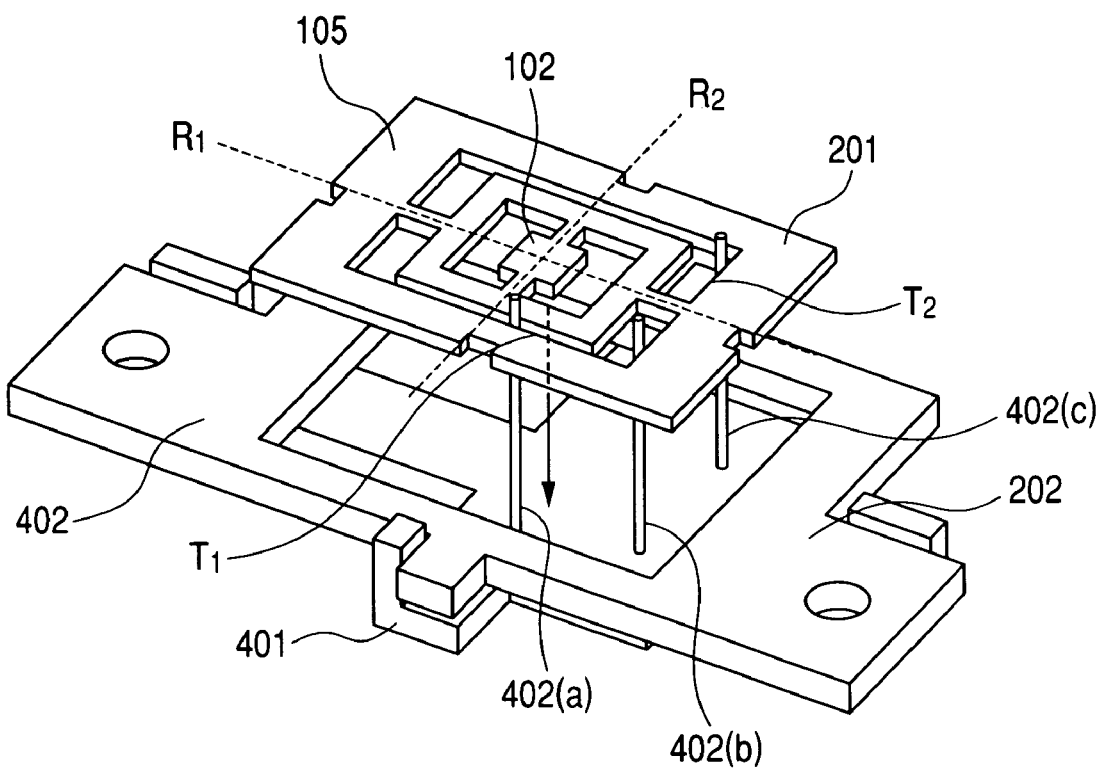
FIG. 4 is an illustrative view of attachment of the scanning device of the first embodiment to a fixing member.

It will now be described how the rotation axes $R_1$ and $R_2$ of the movable mirror 102 are positioned with respect to the respective reference surfaces $A_1$, $B_1$, $D_1$, and $E_1$. Because the scanning device 201 is fabricated through a semiconductor process, an edge $T_1$ formed in a semiconductor-manufacturing process is made precisely parallel to the rotation center axis $R_1$ of the movable mirror 102 as shown in FIG. 3. Similarly, an edge $T_2$ formed in the semiconductor-manufacturing process is also made precisely parallel to the rotation center axis $R_2$. The edges $T_1$ and $T_2$ constitute a positioning portion for positioning the movable mirror 102 with respect to the fixing member 202. Hence, the movable mirror 102 can be fixed to the fixing member 202, with the reference surfaces of the fixing member 202 being coincident with the rotation axes of the movable mirror 102, by preparing a positioning jig 401 adjusted with respect to the fixing member 202 as illustrated in FIG. 4, and securely pressing positioning pins 402(a) to 402(c) protruding from the positioning jig 401 against the edges $T_1$ and $T_2$. It is not restricted that the positions of the edges $T_1$ and $T_2$, against which the positioning pins 402(a) to 402(*c*) are pressed, be determined as illustrated. In other words, edges of the reflecting surface of the movable mirror 102 may also be used. If this method is adopted, the reference surfaces $A_1$ and $B_1$ of the fixing member 202 represent the rotation center axis $R_1$ of the movable mirror 102, and the reference surfaces $D_1$ and $E_1$ of the fixing member 202 represent the rotation center axis $R_2$ of the movable mirror 102.

A method of making a reference surface of the fixing member 202 coincident with the reflecting surface of the movable mirror 102 in the Z-axis direction will now be described.

Figure 5A:
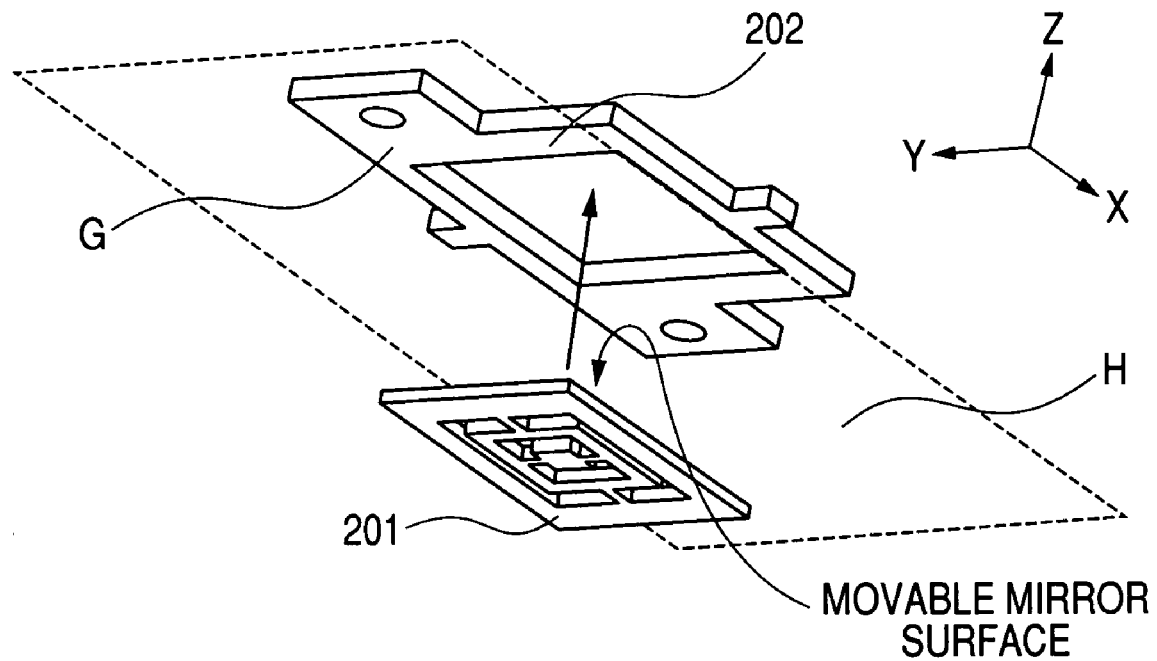
FIGS. 5A and 5B are illustrative views of attachment of the scanning device of the first embodiment to the fixing member.
Figure 5B:
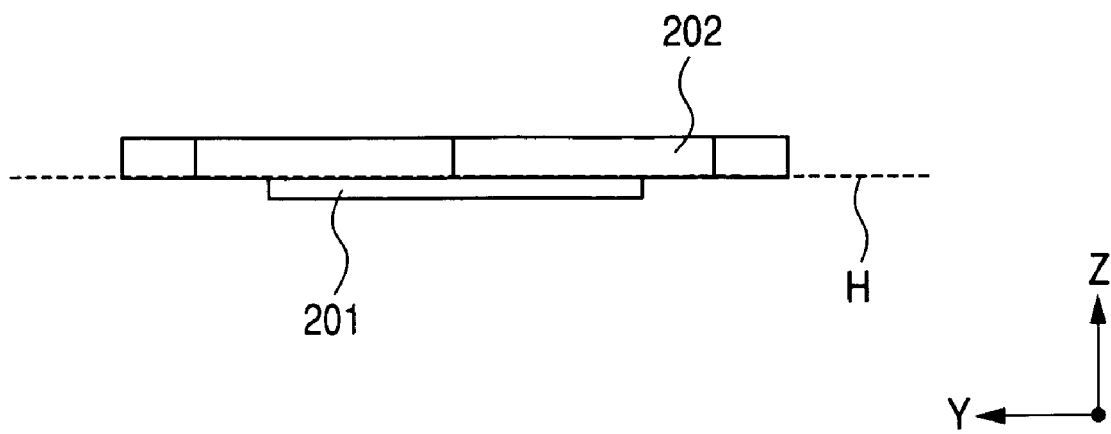

FIG. 5A is an exploded perspective view of the scanning device 201 and the fixing member 202. FIG. 5B is a schematic view of the scanning device 201 and the fixing member 202 in their connected states, as viewed from the X-axis direction.

As described above, since the scanning device 201 is fabricated through a semiconductor process, the movable mirror portion 102 and the support base portion 105 are formed on the same plane with high precision. By firmly thrusting the support base surface against a reference surface G of the fixing member 202 as shown in FIG. 5A, the reference surface G of the fixing member 202 and the movable mirror surface are located on the same plane, that is, a plane H in the Z-axis direction (in this case the plane H may be replaced with another plane parallel to the reference surface G). In this case, the scanning device 201 and the fixing member 202 may be fixed together using an ultraviolet-curing resin or an adhesive, or may be fastened together using screws or the like.

Figure 6:
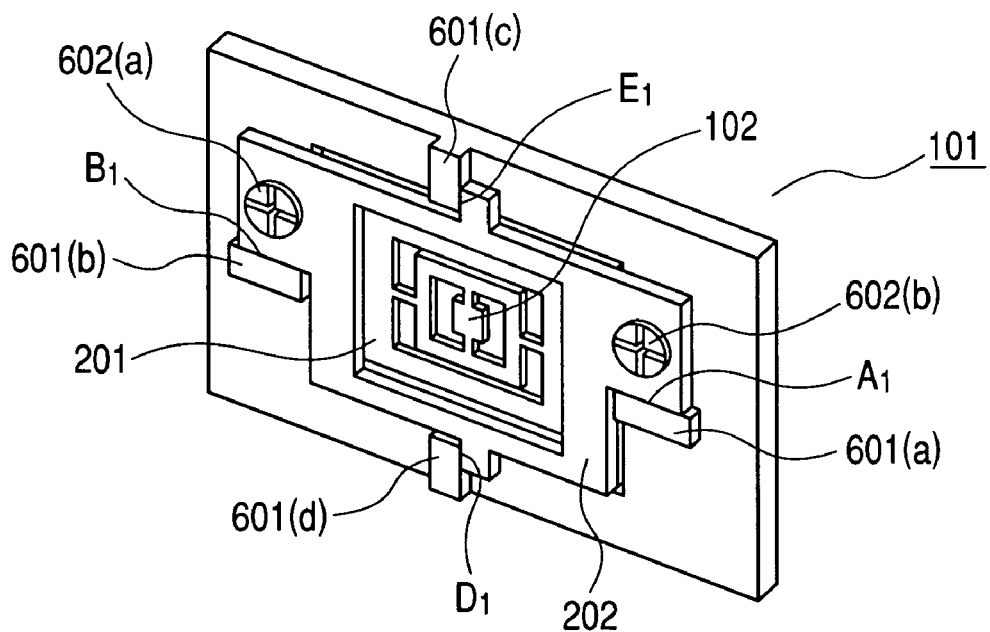
FIG. 6 is an illustrative view of attachment of the scanning device of the first embodiment to the fixing member.

FIG. 6 is a perspective view of the optical scanner 101 of the present invention, which is attached to a component such as a mechanical member installed in a scanner-type image display apparatus, for example.

As shown in FIG. 6, by respectively thrusting the reference surfaces $A_1$, $B_1$, $D_1$, and $E_1$ indicating the rotation center positions of the movable mirror 102 against attachment reference portions 601(*a*) to 601(*d*) of a member to which an optical component or the like is to be attached, the movable mirror 102 can be fixed to the fixing member 202, with the optical axis of the optical component for enlarged display and the center position of the movable mirror 102 of the optical scanner 101 being positioned with high precision. Referring to FIG. 6, the movable mirror 102 is fixed to the other member with two screws 602(*a*) and 602(*b*) to allow the optical scanner 101 to be replaced with another. However, it is also appropriate to use only one screw 602 or more than two screws 602. In place of the screws 602, an ultraviolet-curing resin or an adhesive may be used as well to fix it.

Figure 7:
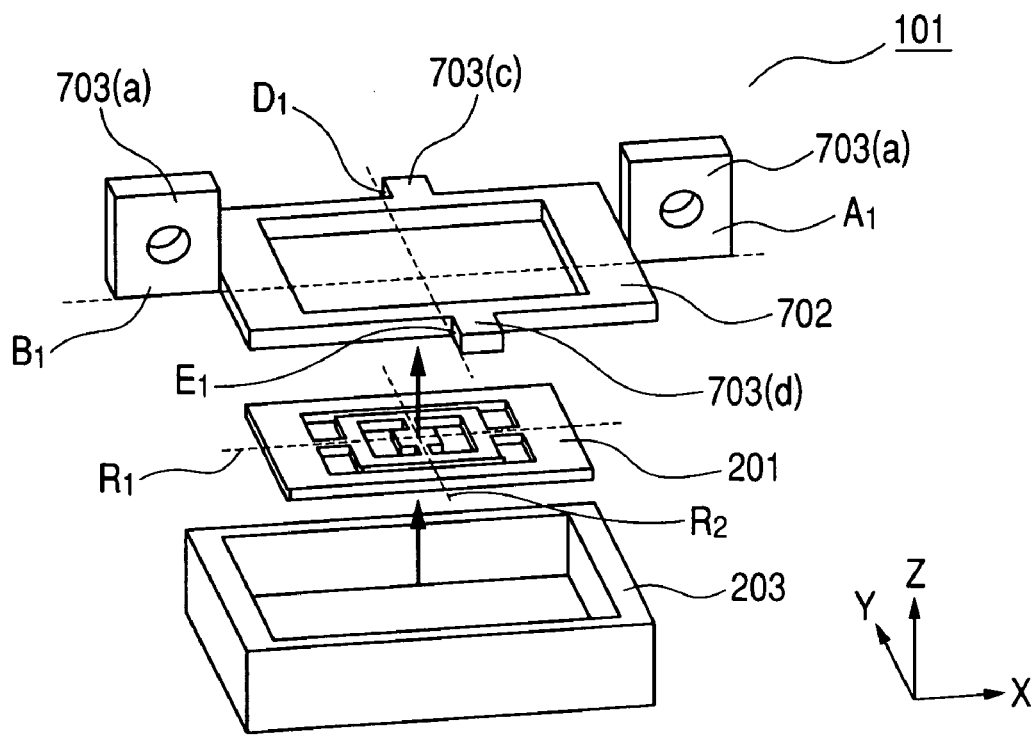
FIG. 7 is an illustrative view of attachment of the optical scanner of the first embodiment to another component.

Although the fixing member 202 shown in FIG. 2 has been described in the first embodiment, a fixing member 702 having a shape as shown in FIG. 7 may also be used instead. Further, although the first embodiment deals with an example in which the scanning device 201 is directly attached to the fixing member 202 as illustrated in FIG. 2, it is also appropriate to attach the scanning device 201 to the fixing member 202 via an additional member interposed therebetween, while making the center axes of the aforementioned movable mirror 102 coincident with the reference surfaces of the fixing member 202 respectively.

As described hitherto, the adoption of such a structure in the first embodiment makes it possible to assemble the optical scanner 101 without the necessity to carry out an adjustment to an optical component or another mechanical component. In addition, since an adjusting mechanism can be dispensed with, downsizing of an apparatus employing the optical scanner as illustrated in the first embodiment can be achieved as well.

Second Embodiment

Figure 8:
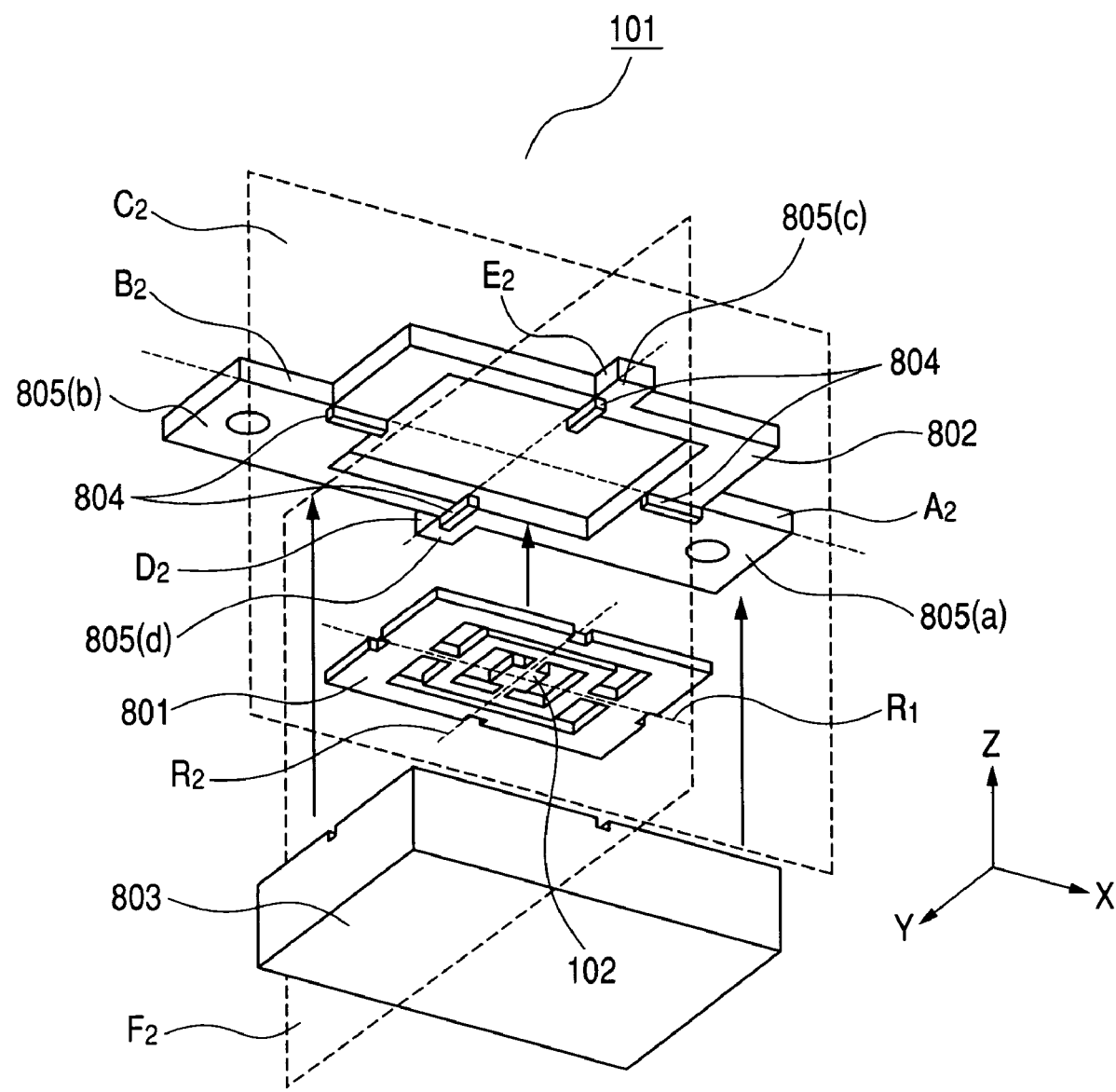
FIG. 8 is a structural view of an optical scanner according to a second embodiment of the present invention.

FIG. 8 is an exploded perspective view of an optical scanner according to a second embodiment of the present invention. The optical scanner 101 has a scanning device 801, a fixing member 802, and a case 803. Although not shown in the second embodiment, an electromagnetic force, an electrostatic force, or the like is used as means for driving the movable mirror 102 of the scanning device 801. Therefore, a coil or a magnet is fixed in the case 803.

As shown in FIG. 8, the fixing member 802 has four attachment portions 805(*a*) to 805(*d*). In the respective attachment portions 805(*a*) to 805(*d*), reference surfaces $A_2$ and $B_2$ of the fixing member 802 are disposed in a plane $C_2$, and the rotation center axis $R_1$, which corresponds to the X-axis direction of the movable mirror 102 of the scanning device 801, is also disposed in the plane $C_2$. Similarly, reference surfaces $D_2$ and $E_2$ of the fixing member 802 are disposed in a plane $F_2$, and the rotation center axis $R_2$, which corresponds to the Y-axis direction of the movable mirror 102 of the scanning device 801, is also disposed in the plane $F_2$.

Figure 9A:
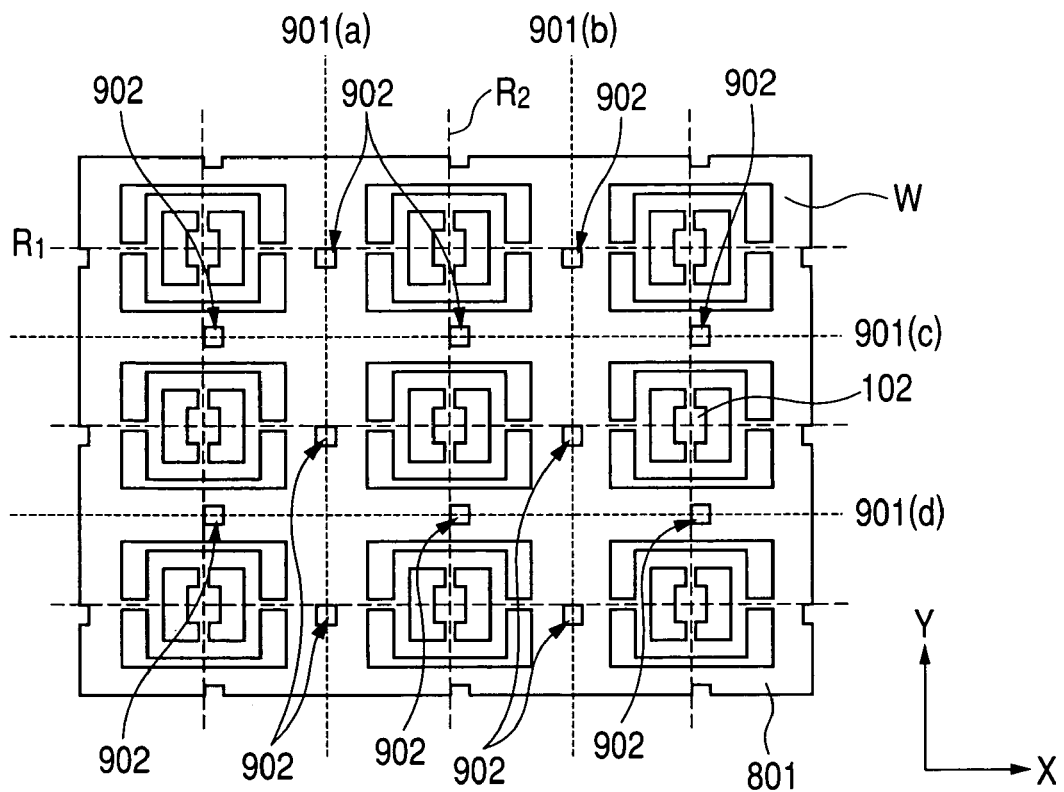
FIGS. 9A and 9B illustrate how to fabricate notch portions in the scanning device.

It will now be described how the rotation axes $R_1$ and $R_2$ of the movable mirror 102 are positioned with respect to the respective reference surfaces $A_2$, $B_2$, $D_2$, and $E_2$. As described above, the scanning device 801 is produced through a semiconductor process. FIG. 9A illustrates a part of a wafer W used in producing the scanning device 801. As shown in FIG. 9A, notch portions (positioning portions) 902 are formed in the wafer W. It is preferable that one edge constituting each of the notch portions 902 be coincident with one of the horizontal or vertical rotation center axis of the movable mirror 102. Alternatively, it is preferable to form the notch portions 902 so as to clearly define a positional relationship with the rotation center axes. As far as the notch portions 902 arranged along broken lines 901(*a*) and 901(*b*) are concerned, their upper edges extending in the X-axis direction as can be seen in FIG. 9A coincide with the rotation center axis $R_1$ for rotation of the movable mirror 102 around the X-axis.

It is also appropriate that lower edges of the notch portions 902 shown in FIG. 9A be coincident with the rotation center axis $R_1$. Similarly, as far as the notch portions 902 arranged along broken lines 901(*c*) and 901(*d*) are concerned, their left edges extending in the Y-axis direction as can be seen in FIG. 9A coincide with the rotation center axis $R_2$ for rotation of the movable mirror 102 around the Y-axis.

Figure 9B:
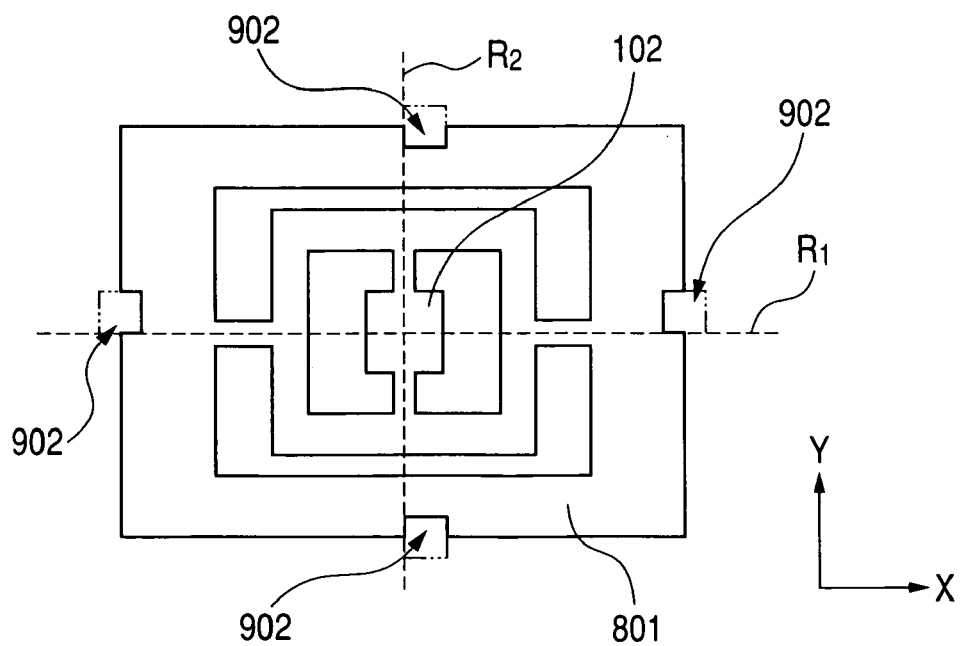
Figure 10A:
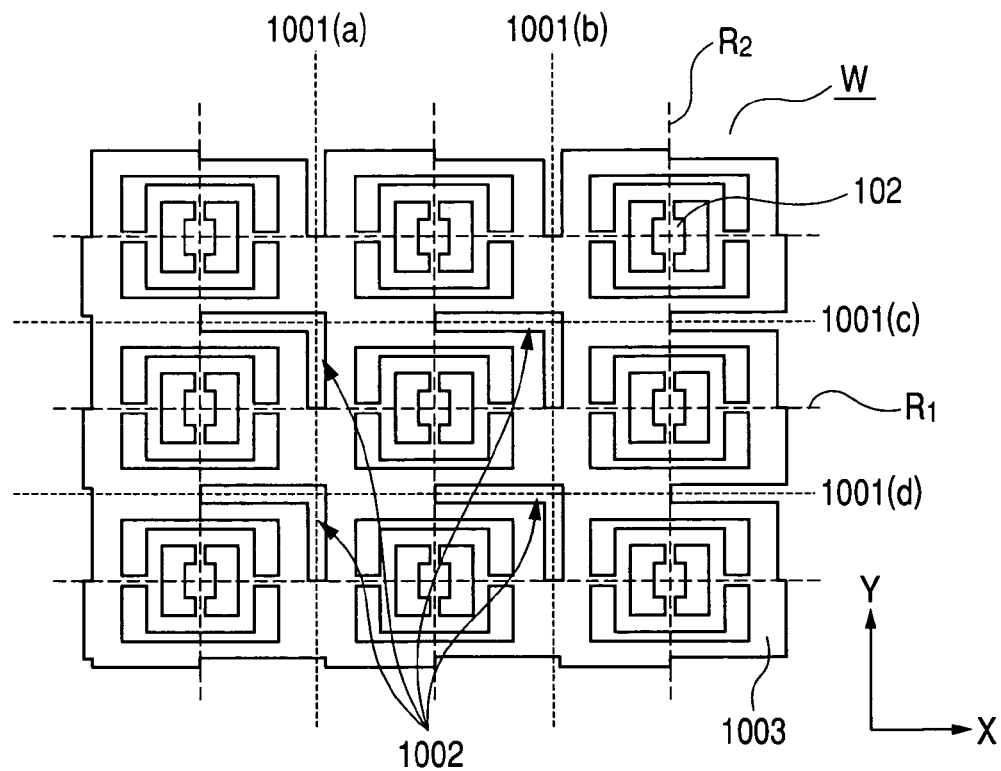
FIGS. 10A and 10B illustrate how to fabricate notch portions in the scanning device.
Figure 10B:
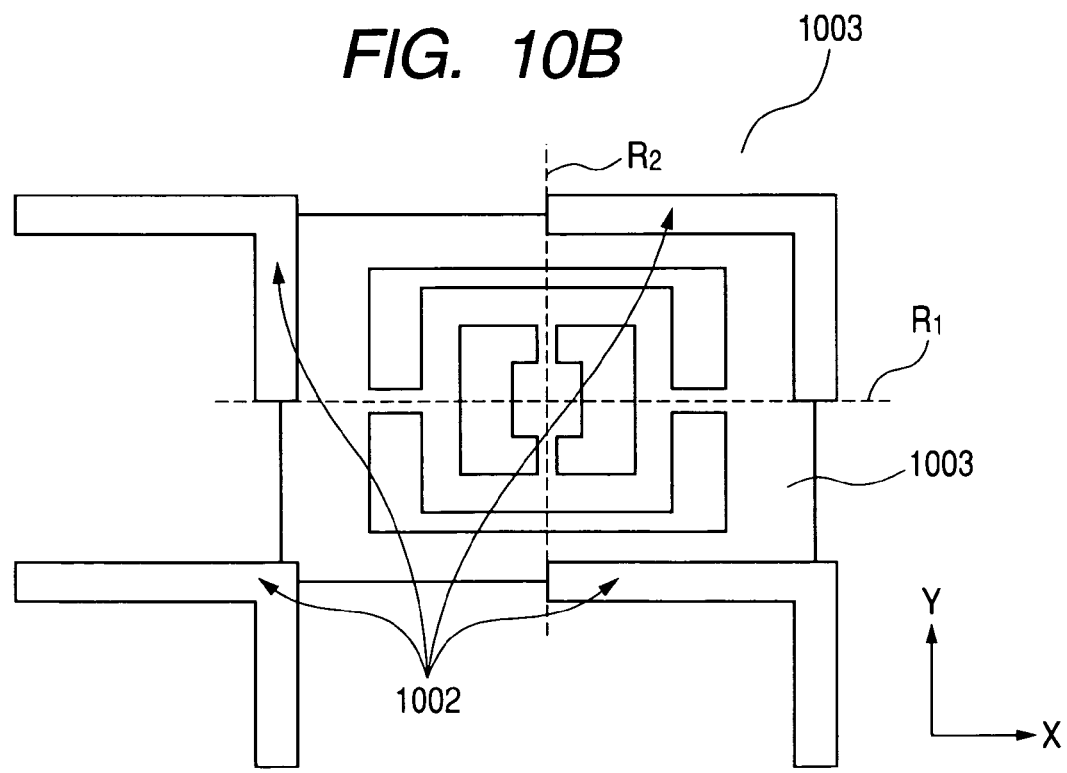

It is also appropriate that right edges of the notch portions 902 shown in FIG. 9A be coincident with the rotation center axis $R_2$. In cutting the scanning device 801 out of the wafer W, the wafer W is cut along the broken lines 901(*a*) to 901(*d*) shown in FIG. 9A so as to leave the edges coincident with the horizontal (X-axis direction) and vertical (Y-axis direction) rotation center axes $R_1$ and $R_2$ of the movable mirror 102. As a result, as shown in FIG. 9B, the scanning device 801 having the edges indicating the horizontal and vertical rotation center axes $R_1$ and $R_2$ of the movable mirror 102 can be produced. FIG. 10A illustrates a part of the wafer W having notch portions 1002 of another shape. According to the same method as described above, a scanning device 1003 as shown in FIG. 10B can be produced by cutting the wafer W along broken lines 1001(*a*) to 1001(*d*) in FIG. 10A so as to leave those edges of the notch portions 1002 which are coincident with the horizontal and vertical rotation center axes $R_1$ and $R_2$ of the movable mirror 102.

As shown in FIG. 8, the fixing member 802 is provided with attachment reference surfaces 804 on which the aforementioned edges of the scanning device 801 abut. In attaching the scanning device 801 to the fixing member 802, if the aforementioned edges are thrust against and attached to the reference surfaces 804, the reference surfaces of the fixing member 802 can be made precisely coincident with the rotation center axes $R_1$ and $R_2$ of the movable mirror 102 respectively without using the jig illustrated in the first embodiment or other tools. In this case, the scanning device 801 and the fixing member 802 may be fixed together using an ultraviolet-curing resin or an adhesive, or may be fastened together using screws, or the like.

To perform positioning in the Z-axis direction or fix the fixing member 802 to other components, a method identical or similar to that of the first embodiment can be adopted.

In the second embodiment, the notch portions 902 are formed in the scanning device 801 in the semiconductor-manufacturing process. This makes the pins (FIG. 4) dispensable in positioning the scanning device 801 with respect to the fixing member.

Although the second embodiment deals with an example in which the scanning device 801 is directly attached to the fixing member 802, it is also appropriate to attach the scanning device 801 to the fixing member 802 via an additional member interposed therebetween, while making the center position of the aforementioned movable mirror 102 coincident with each of the reference surfaces of the fixing member 802.

As described hitherto, the adoption of such a structure makes it possible to assemble the optical scanner 101 without the necessity to carry out an adjustment to an optical component or another mechanical component. In addition, since an adjusting mechanism can be dispensed with, downsizing of an apparatus employing the optical scanner as illustrated in the second embodiment, such as a scanner-type image display apparatus, can be achieved as well.

Third Embodiment

Figure 11:
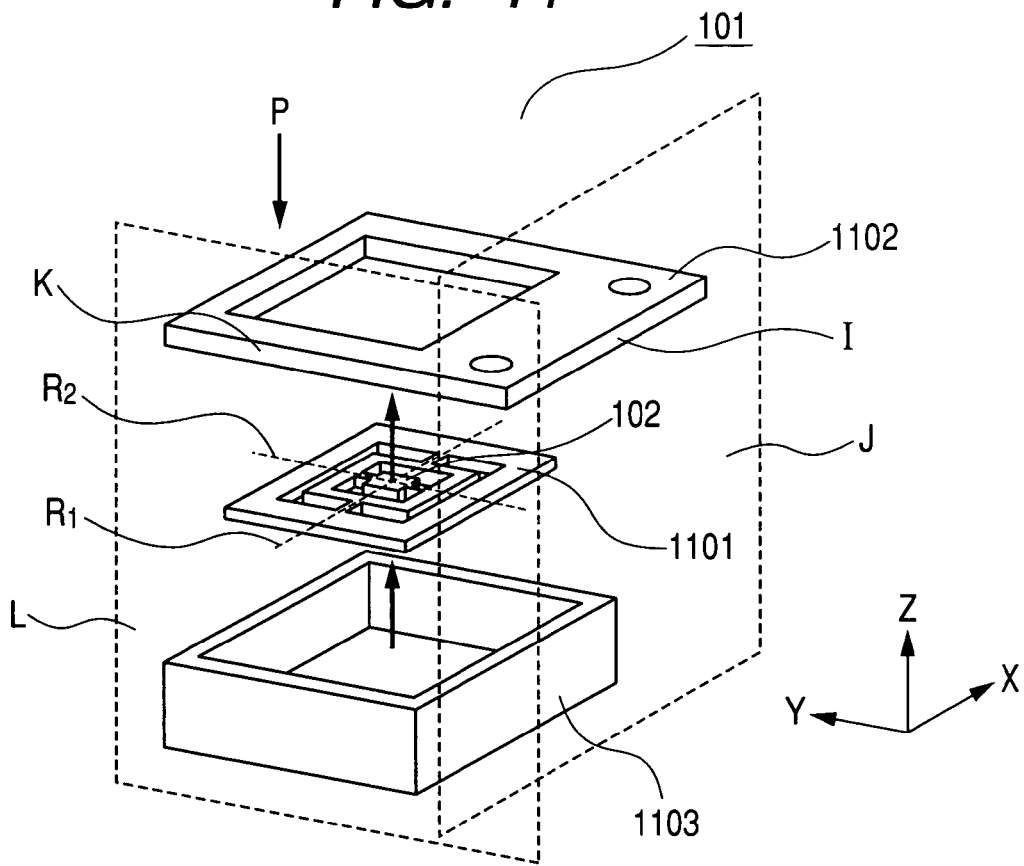
FIG. 11 is a structural view of an optical scanner according to a third embodiment of the present invention.

FIG. 11 is an exploded perspective view of an optical scanner according to a third embodiment of the present invention. The optical scanner 101 has a scanning device 1101, a fixing member 1102, and a case 1103. Although not shown in the third embodiment, an electromagnetic force, an electrostatic force, or the like is used for driving the movable mirror 102 of the scanning device 1101. Therefore, a coil or a magnet is fixed in the case 1103.

As shown in FIG. 11, a plane J including a reference surface I of the fixing member 1102 is disposed parallel to a plane which includes the rotation center axis $R_1$ corresponding to the X-axis direction of the movable mirror 102 of the scanning device 1101 and is perpendicular to the reflecting surface of the movable mirror 102. Similarly, a plane L including a reference surface K of the fixing member 1102 is disposed parallel to a plane which includes the rotation center axis $R_2$ corresponding to the Y-axis direction of the movable mirror 102 and is perpendicular to the reflecting surface of the movable mirror 102.

Figure 12:
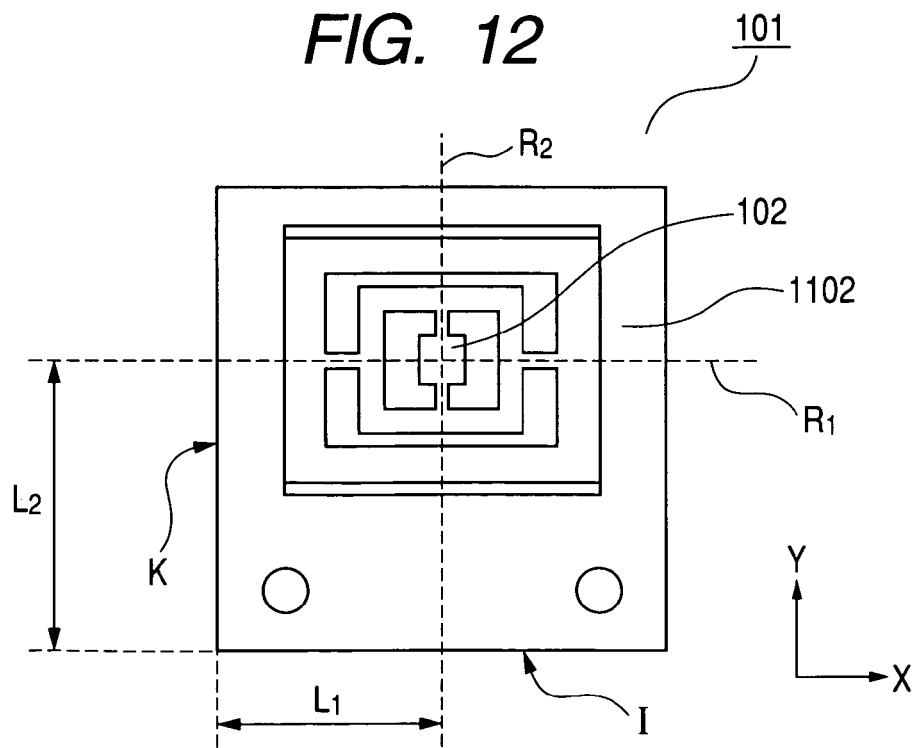
FIG. 12 is an illustrative view of the third embodiment.

FIG. 12 is a schematic view of the optical scanner 101 as viewed from a direction P in FIG. 11. Even in the case where the center axes of the movable mirror 102 do not coincide with the reference surfaces of the fixing member 1102 respectively, the central position of the movable mirror 102 can be indicated by prescribing distances $L_1$ and $L_2$. Thus, an effect identical or similar to that of the above-mentioned embodiments can be obtained. It is also acceptable that only one of the rotation center axes of the movable mirror 102 be coincident with the corresponding reference surfaces of the fixing member. The same holds true for the Z-axis.

Although the third embodiment deals with an example in which the scanning device 1101 is directly attached to the fixing member 1102, it is also appropriate to attach the scanning device 1101 to the fixing member 1102 via an additional member interposed therebetween, while making the center position of the aforementioned movable mirror 102 coincident with each of the reference surfaces of the fixing member 1102.

As described hitherto, due to the adoption of such a structure, the center position of the movable mirror 102 can be found from the reference surfaces I and K of the attachment portions of the fixing member 1102, which makes it possible to assemble the optical scanner 101 without the necessity to carry out an adjustment to an optical component or another mechanical component. In addition, since an adjusting mechanism can be dispensed with, downsizing of an apparatus employing the optical scanner as illustrated in the third embodiment, such as a scanner-type image display apparatus, can be achieved as well.

Fourth Embodiment

Figure 13:
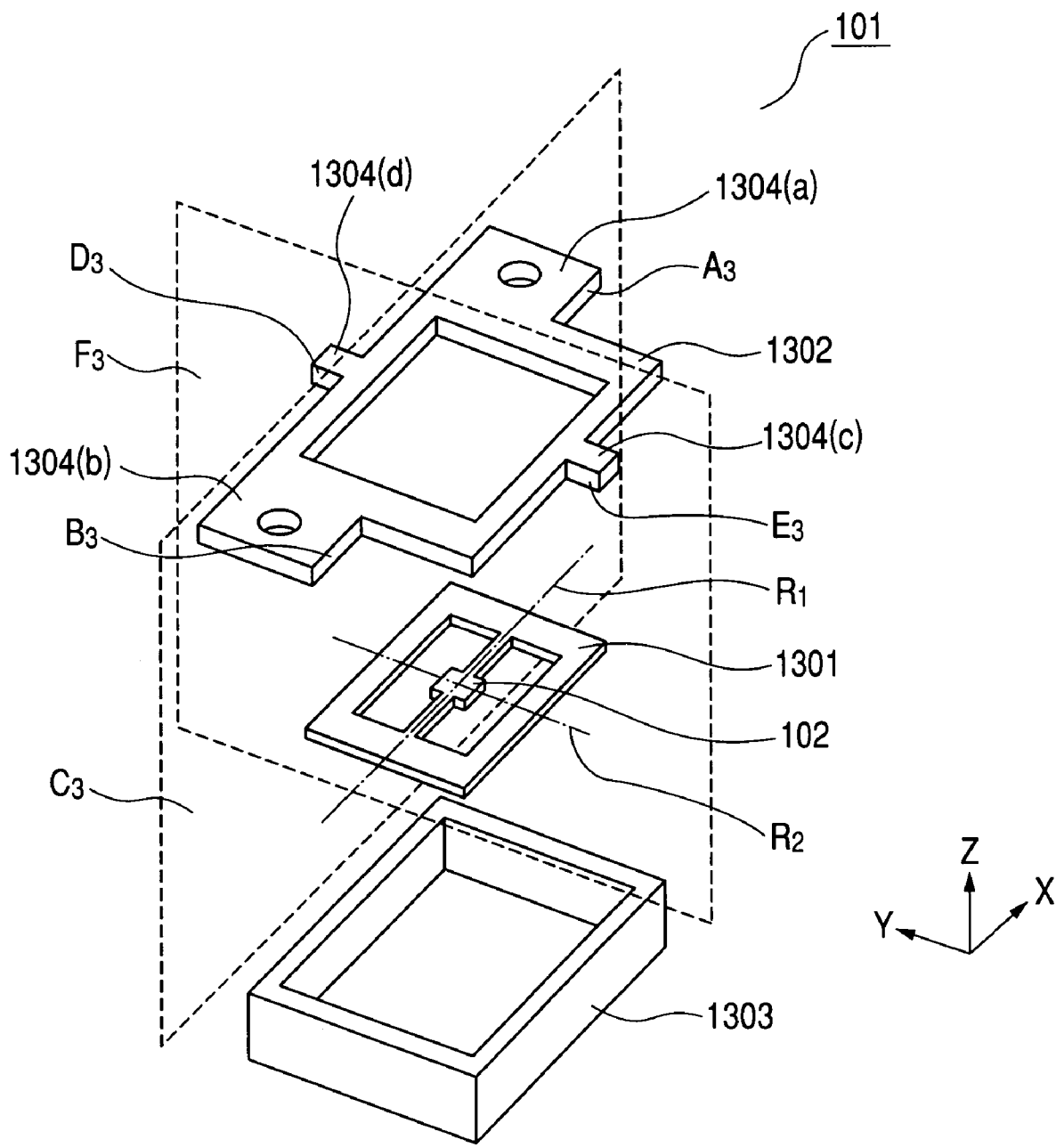
FIG. 13 is an illustrative view of a fourth embodiment of the present invention.

FIG. 13 is an exploded perspective view of an optical scanner according to a fourth embodiment of the present invention. The optical scanner 101 has a scanning device 1301, a fixing member 1302, and a case 1303. Although not shown in the fourth embodiment, an electromagnetic force, an electrostatic force, or the like is used as means for driving the movable mirror 102 of the scanning device 1301. Therefore, a coil or a magnet is fixed in the case 1303.

Although the first to third embodiments deal with the scanning device of double-axis type, the fourth embodiment deals with the scanning device of single-axis type.

As shown in FIG. 13, the fixing member 1302 has four attachment portions 1304(a) to 1304(d). In the respective attachment portions 1304(a) to 1304(d), reference surfaces $A_3$ and $B_3$ of the fixing member 1302 are disposed in a plane $C_3$, and the rotation center axis $R_1$ corresponding to the X-axis direction of the movable mirror 102 of the scanning device 1301 is also disposed in the plane $C_3$. Similarly, reference surfaces $D_3$ and $E_3$ of the fixing member 1302 are disposed in a plane $F_3$, and a center line $R_2$ corresponding to the Y-axis direction of the movable mirror 102 of the scanning device 1301 is also disposed in the plane $F_3$.

Owing to this structure, the single-axis scanning device 1301 can also be treated substantially in the same manner as the double-axis scanning devices as illustrated in the aforementioned first to third embodiments.

The scanning device 1301 and the fixing member 1302 can be positioned with respect to each other in the same manner as in the aforementioned embodiments.

Although the fourth embodiment deals with an example in which the scanning device 1301 is directly attached to the fixing member 1302, it is also appropriate to attach the scanning device 1301 to the fixing member 1302 via an additional member interposed therebetween, while making the center position of the aforementioned movable mirror 102 coincident with each of the reference surfaces of the fixing member 1302.

As described hitherto, the adoption of such a structure makes it possible to assemble the optical scanner 101 without the necessity to carry out an adjustment to an optical component or another mechanical component. In addition, since an adjusting mechanism can be dispensed with, downsizing of an apparatus employing the optical scanner as illustrated in the fourth embodiment, such as a scanner-type image display apparatus, can be achieved as well.

Figure 14:
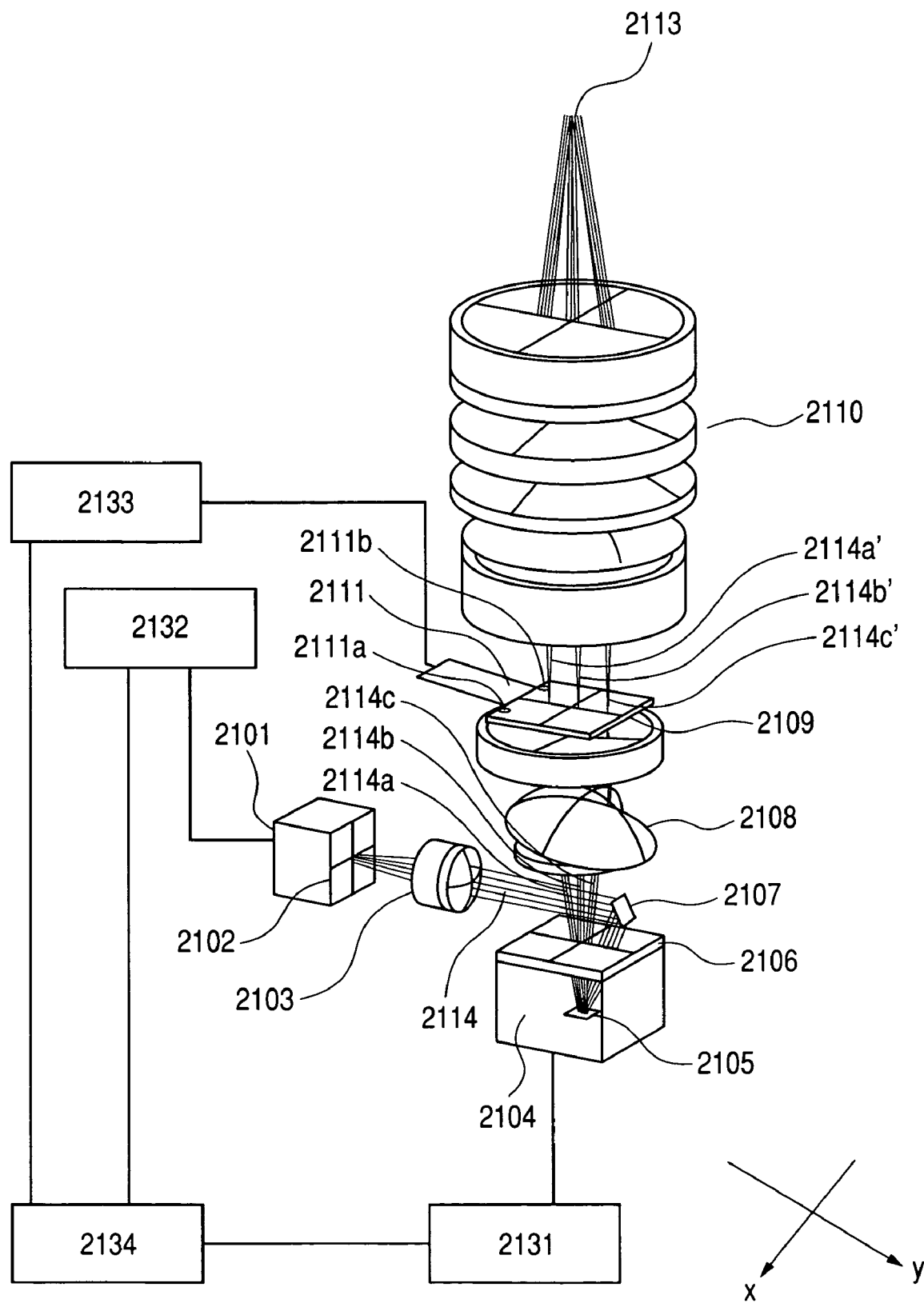
FIG. 14 is an illustrative view of a scanner-type image display apparatus.

FIG. 14 is a schematic view of the main part of a scanner-type image display apparatus used for an electronic viewfinder employing the optical scanner 101 of the present invention.

Referring to FIG. 14, light beams including plural kinds of colored light emitted from light source means 2101 sequentially pass through a color synthesis optical system 2102 synthesizing the plural kinds of colored light, a light-condensing optical system 2103 constituted by a condenser lens, a collimating lens, or the like, a deflecting mirror 2107, and a cover glass 2106, and are incident on light scanning means 2104 capable of performing two-dimensional scanning. The light scanning means 2104, in which a deflecting mirror 2105 based on the MEMS technology is installed, two-dimensionally scans with the incident light beams at a predetermined scanning angle. In FIG. 14, x denotes a horizontal scanning direction (x-direction), and y denotes a vertical scanning direction (y-direction). The scanning means 2104 performs scanning in a swinging manner in the x-direction.

With light beams 2114 incident on the light scanning means 2104 is scanned by the deflecting mirror 2105 installed therein, for example, as indicated by light beams 2114a, 2114b, and 2114c.

With the light beams via a scanning optical system 2108, the surface to be scanned 2109 is scanned. The light source means 2101 and the surface to be scanned 2109 establish a conjugate relationship via the light-condensing optical system 2103, the scanning optical system 2108, and the like. Thus, a light source image of the light source means 2101 is formed on the surface to be scanned 2109. It should be noted that symbols 2114a', 2114b', and 2114c' denote light source images formed on the surface to be scanned 2109 by the scanning light beams 2114a, 2114b, and 2114c, respectively. FIG. 14 shows an exemplary case in which scanning is performed in the y-direction.

A transparent or light-diffusing member is disposed on the surface to be scanned 2109, where a two-dimensional image is formed.

The light source means 2101 is electrically connected to a light source drive circuit 2132. The scanning means 2104 is electrically connected to a scanning means control circuit 2131. The light source drive circuit 2132 and the scanning means control circuit 2131, which are connected to a display portion drive circuit 2134, synchronously control the light source means 2101 and the scanning means 2104 for a video signal corresponding to a desired image which is input from a video signal inputting means (not shown), thereby ensuring the display of the desired image on the surface to be scanned 2109.

Light beams of the image formed on the surface to be scanned 2109 are incident on an ocular optical system 2110. An exit pupil 2113 is located at an exit pupil position of the ocular optical system 2110, and an observer (not shown) observes a virtual image of the image formed on the surface to be scanned 2109 with the exit pupil 2113 serving as a pupil, with the aid of an afterimage effect. It is to be noted that reference numeral 2111 (2111a, 2111b) denotes synchronous light detecting means for obtaining a synchronizing signal for setting a scanning starting position. This synchronous light detecting means is disposed in the surface to be scanned 2109 on which a light source image of the light source means 2101 is formed. On the surface to be scanned 2109, the synchronous light detecting means 2111 is disposed outside an effective area for actually displaying an image in the y-direction as the vertical scanning direction.

In the image display apparatus employing the optical scanner according to each of the aforementioned embodiments, a surface to be scanned is two-dimensionally scanned with light beams modulated on the basis of image information and emitted from the light source means, and an image formed on the surface to be scanned is observed via an optical system. It is also appropriate, however, to two-dimensionally scan the retina of an observer's eyeball directly with light beams modulated on the basis of image information and emitted from the light source means, and to cause the observer to realize the image information.

This application claims priority from Japanese Patent Application No. 2004-038267 filed Feb. 16, 2004, which is hereby incorporated by reference herein.

What is claimed is:

1. An optical scanner comprising:
 a scanning device having a movable mirror, an elastic support portion for supporting the movable mirror such that the movable mirror can swing around a swinging center, a support base for supporting the elastic support portion, and swinging means for swinging the movable mirror; and
 a fixing member having a first attachment portion and a second attachment portion for attachment of the scanning device,
 wherein the fixing member includes a first surface formed on a plane of a surface of the movable mirror;
 wherein the first attachment portion includes a second surface formed on a plane which is perpendicular to the surface of the movable mirror and includes a swinging center R1; and
 wherein the second attachment portion includes a third surface formed on a plane which is perpendicular to a surface of the movable mirror and includes a center line R2 perpendicular to the swinging center R1 in the surface of the movable mirror.

2. An optical scanner according to claim 1, wherein the scanning device includes another swinging center axis $R_2$ for the movable mirror in coincidence with the center line perpendicular to the swinging center $R_1$ in the surface of the movable mirror.

3. An optical scanner according to claim 1, wherein the scanning device has a notch portion for positioning the scanning device with respect to the fixing member.

4. An optical scanner according to claim 1, wherein the scanning device has a positioning portion that is formed through a semiconductor-manufacturing process to position the scanning device with respect to the fixing member.

5. An image display apparatus which two-dimensionally scans a surface to be scanned with light beams modulated on a basis of image information and emitted from light source means, by using the optical scanner according to claim 1, for observing an image formed on the surface to be scanned via an optical system.

6. An image display apparatus for observing an image obtained by two-dimensional scanning with light beams modulated on a basis of image information and emitted from light source means by using the optical scanner according to claim 1.

7. An optical scanner comprising:
 a scanning device having a movable mirror, an elastic support portion supporting the movable mirror such that the movable mirror can swing around a swinging center, a support base supporting the elastic support portion, and swinging means for swinging the movable mirror; and a fixing member having plural attachment portions for attachment of the scanning device, wherein the fixing member and the plural attachment portions have a first surface, a second surface and a third surface, wherein the first surface is formed on a plane parallel to a surface of the movable mirror;

wherein the second surface is formed in parallel to a plane which is perpendicular to the surface of the movable mirror surface and includes a swinging center R1; and wherein the third surface is formed on a plane parallel to a plane including a center line R2 perpendicular to the swinging center R1 in the surface of the movable mirror.

8. An optical scanner according to claim 7, wherein the scanning device includes another swinging center axis $R_2$ for the movable mirror in coincidence with the center line perpendicular to the swinging center $R_1$ in the surface of the movable mirror.

9. An image display apparatus which two-dimensionally scans a surface to be scanned with light beams modulated on a basis of image information and emitted from light source means, by using the optical scanner according to claim 7, for observing an image formed on the surface to be scanned via an optical system.

10. An image display apparatus for observing an image obtained by two-dimensional scanning with light beams modulated on a basis of image information and emitted from light source means by using the optical scanner according to claim 7.

* * * * *